United States Patent
Maggiari et al.

(10) Patent No.: US 9,590,881 B2
(45) Date of Patent: Mar. 7, 2017

(54) MONITORING CARRIER ETHERNET NETWORKS

(75) Inventors: Massimiliano Maggiari, Genova (IT); Michela Bevilacqua, Genova (IT); Carla Marcenaro, Genova (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 35 days.

(21) Appl. No.: 14/374,905

(22) PCT Filed: Feb. 23, 2012

(86) PCT No.: PCT/EP2012/053058
§ 371 (c)(1),
(2), (4) Date: Nov. 10, 2014

(87) PCT Pub. No.: WO2013/117242
PCT Pub. Date: Aug. 15, 2013

(65) Prior Publication Data
US 2015/0055486 A1 Feb. 26, 2015

(30) Foreign Application Priority Data
Feb. 7, 2012 (EP) .................................... 12154269

(51) Int. Cl.
*H04L 12/26* (2006.01)
*H04L 12/801* (2013.01)
(Continued)

(52) U.S. Cl.
CPC ...... *H04L 43/0805* (2013.01); *H04L 41/5035* (2013.01); *H04L 43/0847* (2013.01);
(Continued)

(58) Field of Classification Search
CPC ............. H04L 41/5035; H04L 43/0805; H04L 43/0847; H04L 43/0876; H04L 45/02;
(Continued)

(56) References Cited

U.S. PATENT DOCUMENTS

2003/0067928 A1* 4/2003 Gonda ................ H04L 12/4641
370/401
2003/0101252 A1* 5/2003 Lacey, III ........... H04L 41/0213
709/223
(Continued)

FOREIGN PATENT DOCUMENTS

EP 2 107 733 A1 10/2009
EP 2 110 992 A1 10/2009
WO 2008/128572 A1 10/2008

OTHER PUBLICATIONS

PCT International Search Report, mailed Dec. 17, 2012, in connection with International Application No. PCT/EP2012/053058—all pages.

*Primary Examiner* — Stephen J Clawson
(74) *Attorney, Agent, or Firm* — Leffler Intellectual Property Law, PLLC

(57) ABSTRACT

A Carrier Ethernet network comprises nodes connected by links. The network supports connectionless traffic flows between nodes. A network management system performs a method comprising: determining when an event has occurred in the network which may change bandwidth usage on a link of the network; determining traffic flows which use the link; determining a total bandwidth demand of the traffic flows using the link; and comparing the total bandwidth demand with a bandwidth capacity of the link. Determining when the event has occurred can include at least one of: receiving an alarm indicating a network fault; receiving a topology change indication from a node of the network.

12 Claims, 8 Drawing Sheets

(51) Int. Cl.
*H04L 12/729* (2013.01)
*H04L 12/751* (2013.01)
*H04L 12/707* (2013.01)
*H04L 12/703* (2013.01)
*H04L 12/24* (2006.01)
*H04L 12/721* (2013.01)
*H04L 12/851* (2013.01)

(52) U.S. Cl.
CPC .......... *H04L 43/0876* (2013.01); *H04L 45/02* (2013.01); *H04L 45/125* (2013.01); *H04L 45/22* (2013.01); *H04L 45/28* (2013.01); *H04L 47/127* (2013.01); *H04L 45/38* (2013.01); *H04L 47/12* (2013.01); *H04L 47/2425* (2013.01); *H04L 47/29* (2013.01)

(58) Field of Classification Search
CPC ....... H04L 45/125; H04L 45/22; H04L 45/28; H04L 45/38; H04L 47/127; H04L 47/2425; H04L 47/29
USPC ........................................................ 370/242
See application file for complete search history.

(56) References Cited

U.S. PATENT DOCUMENTS

| | | | |
|---|---|---|---|
| 2004/0027995 A1* | 2/2004 | Miller | H04L 12/1877 370/254 |
| 2005/0073958 A1* | 4/2005 | Atlas | H04L 45/00 370/238 |
| 2006/0159020 A1 | 7/2006 | Porat | |
| 2007/0076604 A1* | 4/2007 | Litwack | H04L 43/0882 370/230 |
| 2013/0107716 A1* | 5/2013 | Volpe | H04L 49/40 370/235 |

* cited by examiner

MONITORING CARRIER ETHERNET NETWORKS

CROSS-REFERENCE TO RELATED APPLICATIONS

This application claims priority under 35 U.S.C. §119 to European Patent Application No. 12154269.0, filed Feb. 7, 2012, which is hereby incorporated herein by reference in its entirety.

TECHNICAL FIELD

This invention relates to monitoring a Carrier Ethernet (CE) network by a network management system. The Carrier Ethernet network can comprise a Provider Bridge network or a Provider Backbone Bridge (PBB) network.

BACKGROUND

Network operators are replacing conventional time-division multiplexed (TDM) based transport networks with Ethernet based transport networks, which can allow transport of a wide range of traffic types. Ethernet-based networks comprise a network of Ethernet switches.

Technologies which allow the use of Ethernet switches in carrier networks are Provider Bridge Networks, standardised by the Institute of Electrical and Electronics Engineers as IEEE 802.1ad, and Provider Backbone Bridges (PBB), standardised as IEEE 802.1ah. Both of these technologies use Virtual Local Area Network (VLAN) tags to identify traffic belonging to particular customers. PBB is a technology which allows for layering of the Ethernet network into customer and provider domains with complete isolation among their MAC addresses. In this way, a customer's traffic can be carried transparently across a carrier's Ethernet network.

Ethernet networks can be used in a connection-oriented manner using techniques such as Multi-Protocol Label Switching Transport Profile (MPLS-TP) or Provider Backbone Bridge Traffic Engineering (PBB-TE), or in a more conventional connectionless manner. When used in a connectionless manner, the nodes of the Ethernet network use techniques such as flooding and learning to establish a loop-free path between the source and the destination for the configured service. A distributed protocol such as the Spanning Tree Protocol (STP) can be used. In the event of a network disturbance, such as a fault or failure of a link or node, STP will recalculate a loop-free topology. In this specification, the term Ethernet Virtual Connection (EVC) is used to describe a traffic flow across a Carrier Ethernet network between two User Network Interfaces (UNI).

From a fulfillment perspective, traffic tagged with the relevant Virtual Local Area Network (VLAN) tags is configured on all of the ports of switches that can be involved in any of the possible packet routes that the spanning tree protocol can calculate. This gives provider bridge networks a high level of unpredictability in determining where the packets are really flowing in the network for a given Ethernet service at a given time. This is a problem from a service problem detection perspective as, at the time a fault on the data plane is detected by the NMS/OSS system, the traffic could already have been reverted on another route by the spanning tree protocol. Considering also that Ethernet networks are based on statistical multiplexing, it means that it is problematic to identify if a given Ethernet service is affected by traffic degradation or traffic disruption.

One of the factors to help deliver carrier-grade performance in an Ethernet network is to provide OAM (Operation Administration and Maintenance) capabilities that allow the service provider to detect, isolate and eliminate faults in the network to prevent service traffic degradation and, in the worst case, service traffic disruption that highly impact the committed SLA (Service Level Agreement). The IEEE has standardised protocols and practices for Operations, Administration, and Maintenance (OAM) for paths through 802.1 bridges and local area networks (LANs) in IEEE 802.1ag, "IEEE Standard for Local and Metropolitan Area Networks Virtual Bridged Local Area Networks Amendment 5: Connectivity Fault Management". IEEE 802.1ag defines the concept of service OAM, which allows the configuration of Maintenance Entities associated to the Ethernet Service in order to detect if something goes wrong on the Ethernet Service end to end through some connectivity verification procedures. However, service OAM has some limitations. There are limits on the number of Maintenance Entities that are configurable in a network element, and therefore this approach may not be scalable to give a protection for all the configured Ethernet services.

The present invention seeks to provide an alternative way of monitoring a Carrier Ethernet network.

SUMMARY

An aspect of the present invention provides a method of monitoring a Carrier Ethernet network comprising nodes connected by links. The network supports connectionless traffic flows between nodes. The method comprises, at a network management system, determining when an event has occurred in the network which may change bandwidth usage on a link of the network. The method further comprises determining traffic flows which use the link. The method further comprises determining a total bandwidth demand of the traffic flows using the link. The method further comprises comparing the total bandwidth demand with a bandwidth capacity of the link.

Embodiments of the invention provide an indication when an active link is becoming a potential bottleneck for the traffic flows using that link. When this link is in a bottleneck condition it could raise problems in terms of service degradation/disruption for the traffic flows using that link.

Embodiments of the invention provide a complementary, or alternative, way to identify degradation or possible disruption to traffic flows to the use of Service OAM (IEEE 802.1ag). Embodiments of the invention are particularly useful in situations where the maximum number of Service OAM instance has been reached.

The traffic flows can be Ethernet Virtual Connections (EVC). A traffic flow may be identified by a Virtual Local Area Network Identifier (VLAN ID), which is also called a VLAN tag. Embodiments of the invention apply to any provider bridge network (PB, PBB) with any version of the Spanning Tree Protocol (i.e. STP, Rapid STP (RSTP) or Multiple STP (MSTP) switched transport infrastructure.

Advantageously, the steps of: determining traffic flows which use the link; determining a total bandwidth demand of the traffic flows using the link; and comparing the total bandwidth demand with a bandwidth capacity of the link are repeated for a plurality of different links of the network.

Advantageously, the method further comprises reporting a link degradation if the step of comparing the total bandwidth demand with a bandwidth capacity of the link indicates that the total bandwidth demand exceeds the bandwidth capacity of the link.

Advantageously, the step of determining traffic flows which use the link comprises querying a node of the network to retrieve active topology information.

Advantageously, the step of determining traffic flows which use the link comprises using a store of information which indicates a spanning tree instance and a traffic flow using that spanning tree.

Advantageously, the step of determining a total bandwidth demand of the traffic flows using the link comprises using a store of information which indicates traffic flows and parameters of each of the traffic flows.

Advantageously, the step of determining a total bandwidth demand of the traffic flows using the link comprises: determining a Committed Information Rate for each of the traffic flows using the link; and, determining a sum of the Committed Information Rates of the traffic flows using the link.

Advantageously, the step of determining when an event has occurred in the network which may change bandwidth usage on a link of the network comprises at least one of: receiving an alarm indicating a network fault; receiving a topology change indication from a node of the network; receiving a new root indication from a node of the network.

Advantageously, the step of determining when an event has occurred in the network which may change bandwidth usage on a link of the network comprises: receiving an alarm indicating a network fault; and, waiting for a time period for nodes of the network to converge on an active topology.

Another aspect of the invention provides apparatus which is arranged to perform any of the described or claimed steps of the method. In particular, an aspect of the invention provides apparatus for use at a network management system of a network. The network comprises nodes connected by links. The network supports connectionless traffic flows between nodes. The apparatus comprises an event monitor which is arranged to determine when an event has occurred in the network which may change bandwidth usage on a link of the network. The apparatus comprises a traffic monitor which is arranged to determine traffic flows which use the link. The apparatus comprises a bandwidth monitor which is arranged to determine a total bandwidth demand of the traffic flows using the link. The apparatus comprises a comparator which is arranged to compare the total bandwidth demand with a bandwidth capacity of the link.

Another aspect of the invention provides a communication network comprising any of the described or claimed apparatus.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory medium. The machine-readable instructions can be downloaded to the storage medium via a network connection.

BRIEF DESCRIPTION OF THE DRAWINGS

Embodiments of the invention will be described, by way of example only, with reference to the accompanying drawings in which.

DETAILED DESCRIPTION

Figure 1:
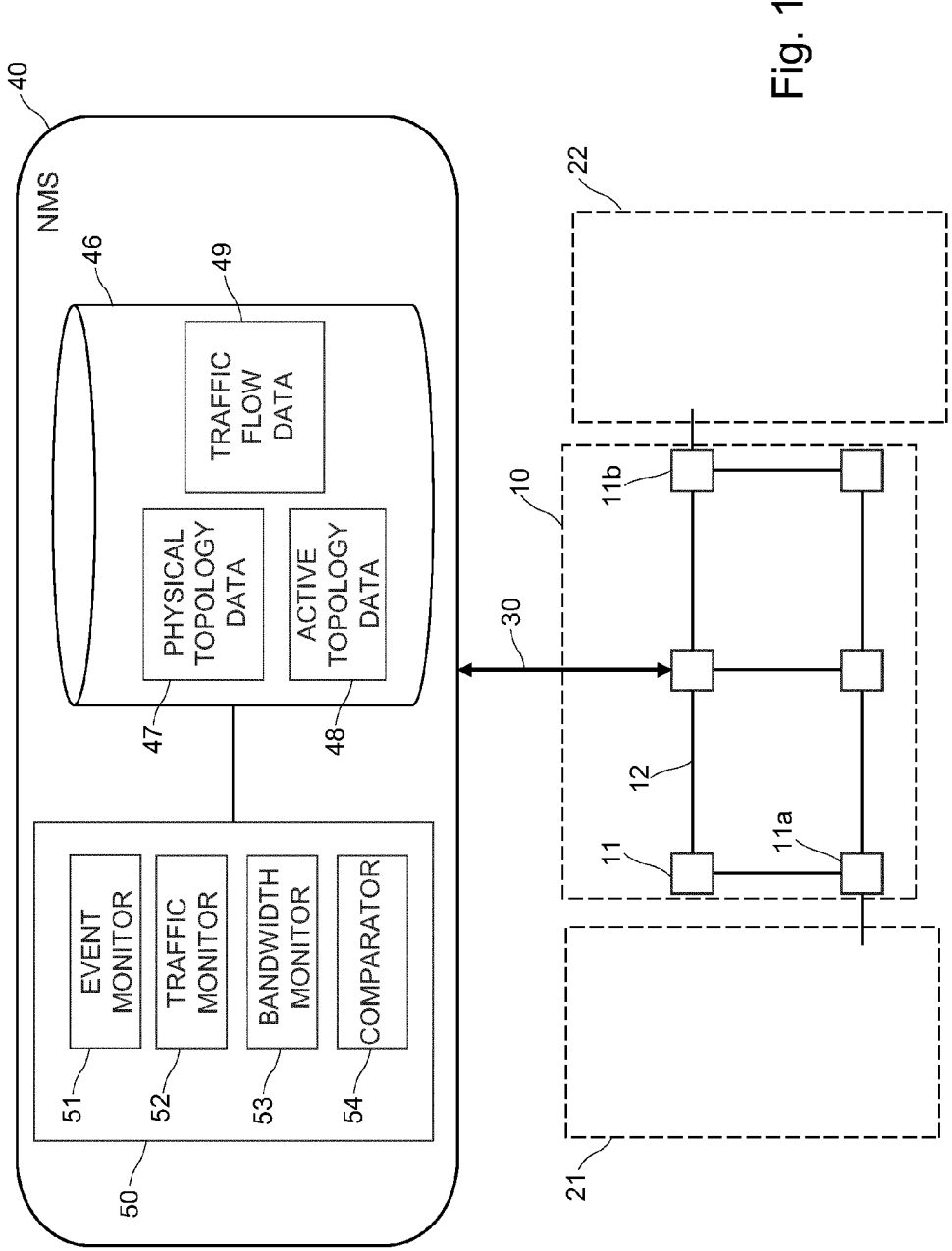
FIG. 1 shows a carrier network and a network management system for the network in accordance with an embodiment of the invention.

FIG. 1 shows an example of a communication network 10 in accordance with an embodiment of the present invention. The network 10 comprises a plurality of nodes 11, connected by links 12. The network 10 has a frame/packet-based transport layer, and each node 11 switches frames/packets between input and output ports of the node based on information carried in a header of each frame/packet. In FIG. 1 the network 10 can be a provider network, such as a Provider Backbone Bridged Network (PBBN) as defined in IEEE 802.1ah, or a Provider Bridged Network, as defined in IEEE 802.1ad. Network 10 can connect to other networks 21, 22, such as access networks or customer networks. Nodes 11a, 11b which connect to other networks are called edge nodes. For a PBBN the edge nodes are called Backbone Edge Bridges (BEB). For a Provider Bridged Network the edge nodes are called Provider Edge Bridges (BEB). The physical layer connecting nodes 11 can be optical, electrical or wireless, and is not important to the invention.

In use, Ethernet Virtual Connections (EVC) are established across the network 10 between User Network Interfaces (UNI). A UNI may be located at one of the edge nodes 11a, 11b, or at a node of one of the outlying networks 21, 22. One function of a provider network is that it can carry traffic belonging to different customers. Virtual Local Area Network tags (VLAN) are used to separate traffic of different customers. Stacked VLAN (i.e. VLAN in VLAN encapsulation or Q-in-Q) may be used to protect any VLAN tags already used by the customer traffic. In a PBBN, all traffic is encapsulated at the edge node 11a, 11b where the traffic ingresses the PBBN, and an additional header identifies the destination edge node of the PBBN. Additional fields of the new header can separate traffic belonging to different customers. The encapsulation is removed when traffic egresses the PBBN at another of the edge nodes 11a, 11b.

The network 10 supports connectionless traffic flows between edge nodes. This means that the path taken by data frames for a particular customer is not fixed, and has not been established in advance by a NMS/OSS or by control plane signalling. The path taken by data frames for a particular customer can vary during operation in response to topology changes, such as faults/failures of links or nodes. This lack of a unpredictability in the path of a traffic flow also means that the amount of traffic flowing along a particular link of the network is also unpredictable. This can be compared to a connection-oriented Ethernet network, where a path is defined for a traffic flow (i.e. all packets follow the same path) and resources are reserved along that path for the traffic flow, before that path is used to carry traffic. Typically, in a connection-oriented network an alternative path is also pre-planned for a traffic flow in the event of a fault, and dedicated or shared resources are reserved along the alternative path.

FIG. 1 also shows a network management system (NMS) 40 for managing the network 10. The NMS may be centralised at a single node or distributed among a set of nodes. The NMS comprises a controller 50 comprising a set of functional units or modules 51-54 and a data store 46. The functional units comprise: an event monitor 51 which is arranged to determine when an event has occurred in the network which may change bandwidth usage on a link of the network; a traffic monitor 52 which is arranged to determine traffic flows which use the link; a bandwidth monitor 53 which is arranged to determine a total bandwidth demand of the traffic flows using the link; and a comparator 54 which is arranged to compare the total bandwidth demand with a bandwidth capacity of the link. The functional units 51-54 represent the main functions of the controller 50. It will be understood that the functional units 51-54 can be implemented in various ways, such as software modules executed by one or more processors, or by hardware. Each functional unit 51-54 may be implemented by a dedicated processor, or two or more of the multiple functional units 51-54 may be implemented by a common processor. Data store 46 can store:
  (i) physical topology data 47, which is information about how nodes 11 of the network 10 are interconnected to one another;
  (ii) active topology data 48, which is information about the topology used by each virtual connection. Typically, the active topology is established using a protocol such as the STP;
  (iii) traffic flow data 49, which is information about parameters of traffic flows (EVCs) in the network, such as the bandwidth profile of a traffic flow.

The NMS 40 communicates 30 with nodes 11 in the network using a protocol such as the Simple Network Management Protocol (SNMP).

Figure 2:
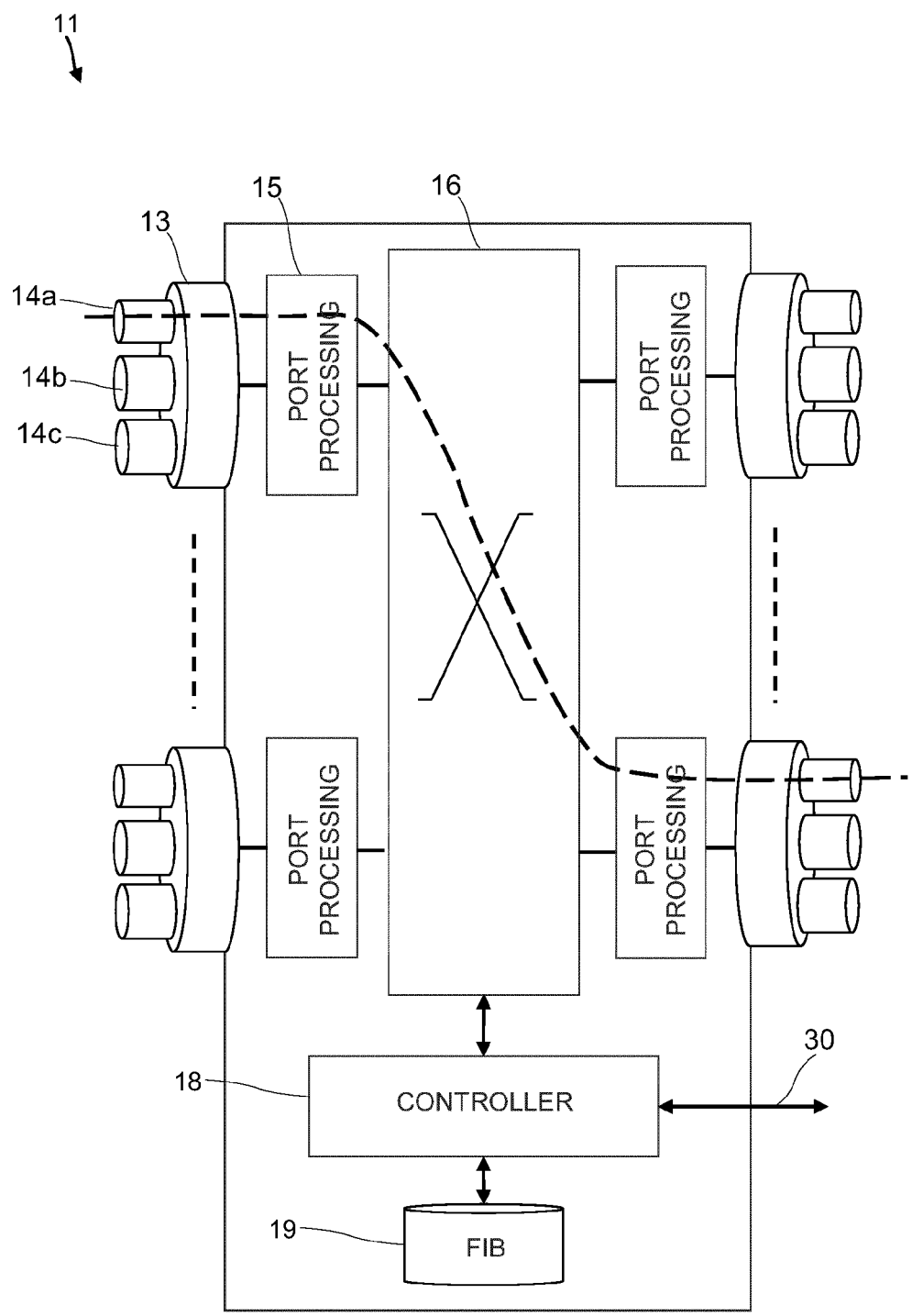
FIG. 2 shows a bridge/switch in the network of FIG. 1.

FIG. 2 schematically shows apparatus at one of the nodes 11 of the network 10 of FIG. 1. The node 11 has a plurality of ports 13. Each port 13 connects to one of the links 12 which leads to another node 11. Each link 12/port 13 may carry multiple Ethernet Virtual Connections (EVC) 14. Three EVCs 14a, 14b, 14c are shown as an example. Each of the EVCs 14a-14c are carried over the same link 12, but the frames carrying each traffic flow have a different VLAN tag, hence the term "virtual connection". A port processing unit 15 can perform functions such as Medium Access Control (MAC) and buffering. Data received at a port 13 is separated into data frames. Fields in the header of a frame, such as one or more of: the destination address field; source address field; VLAN tag are used to determine an egress port 13 for the data packet (payload). A Forwarding Information Base (FIB) 19 is used to determine the egress port for each frame. FIB 19 stores information which is used to select the egress port to which a data packet is forwarded. The FIB 19 is populated by periodically performing the Spanning Tree Protocol (STP). The STP determines a loop-free topology for forwarding packets to destination nodes. A switching fabric 16 interconnects ports 13. A controller 18 controls operation of the node, and performs functions such as look-ups in the FIB 19 and performing the STP. Controller 18 also communicates 30 with the NMS 40. In accordance with embodiments of this invention, controller 18 determines when a change has occurred to the active topology (i.e. the path taken by frames) and can notify the NMS 40 when there is a topology change event. Switches exchange Bridge Protocol Data Units (BPDU) to notify active topology change and configuration changes. Topology change events can be signalled by a topologyChange trap. A bridge that becomes a new root bridge will send a newRoot trap and all other nodes in the topology will send the topologyChange trap.

Figure 3:
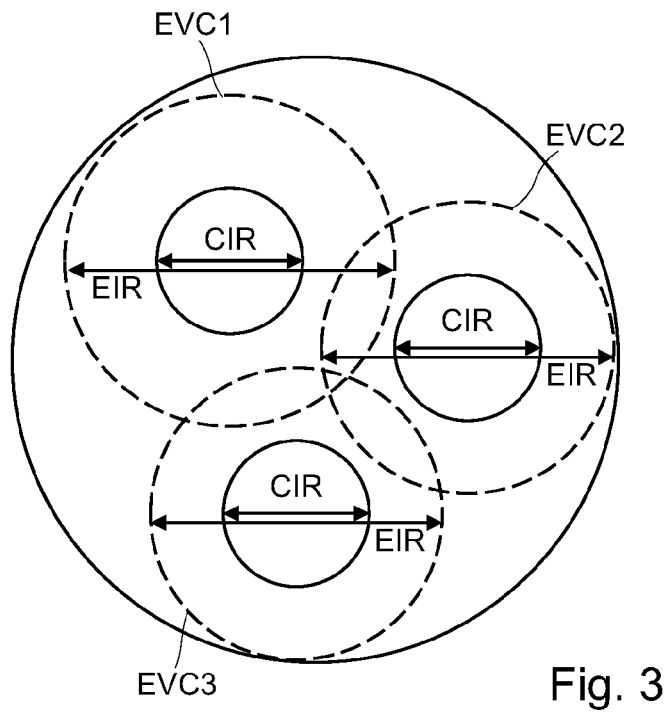
FIGS. 3 and 4 show Ethernet Virtual Connections (EVC) configured on a port or link of the network.
Figure 4:
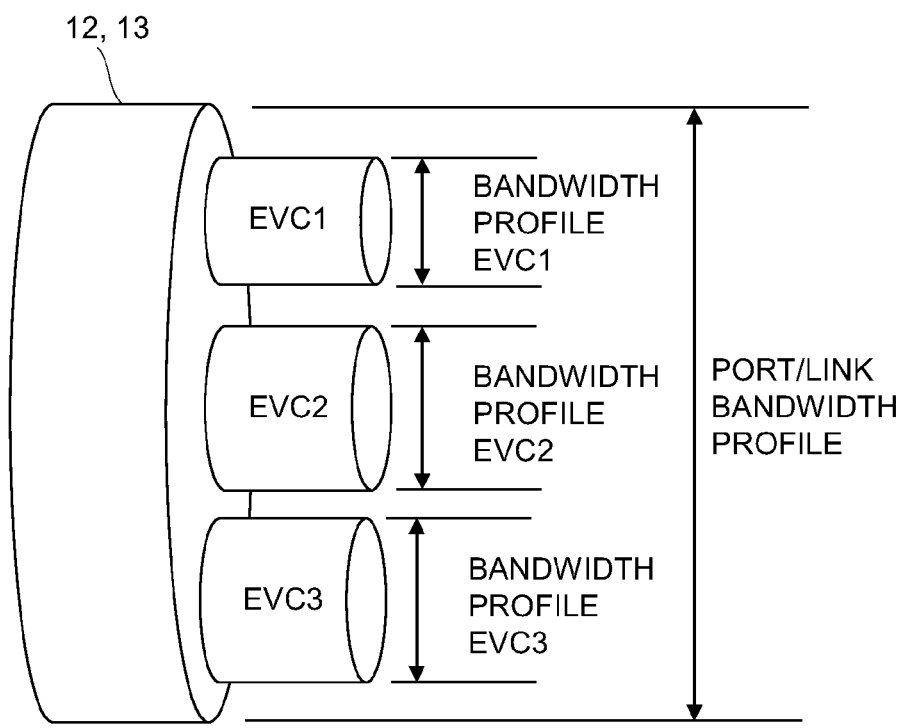

FIGS. 3 and 4 show a set of Ethernet Virtual Connections EVC1, EVC2, EVC3 which all share the same port 13/link 12. As described above, the set of EVCs are identified by different VLAN tags. Each EVC has a bandwidth profile. A bandwidth profile is a limit on the rate at which Ethernet frames can traverse an interface. There can be separate bandwidth profiles for frames ingressing to the network and for frames egressing from the network. The Metro Ethernet Forum (MEF) has defined a bandwidth profile for Ethernet services which four traffic parameters: Committed Information Rate (CIR); Committed Burst Size (CBS); Excess Information Rate (EIR) and Excess Burst Size (EBS). The Committed Information Rate (CIR) is the average rate up to which service frames are delivered per the service performance objectives (delay, loss, etc.) Service frames whose average rate is greater than the CIR, or those which send more than CBS bytes are not CIR-conformant and may be discarded or coloured to indicate non-conformance, depending on whether the service frames are EIR-conformant or not. The Excess Information Rate (EIR) specifies the average rate, greater than or equal to the CIR, up to which service frames are delivered without any performance objectives. Service frames whose average rate is greater than the EIR, or those which send more than EBS bytes, are not EIR-conformant and may be discarded or coloured to indicate non-conformance depending on the service being offered.

As shown in FIG. 3, the bandwidth profiles of services EVC1, EVC2, EVC3 may overlap, and may exceed the bandwidth profile of the link over which they are carried. Under these circumstances, the link may become congested and performance of one or more of EVC1, EVC2, EVC3 may become be degraded, and fail to meet the Service Level Agreement (SLA) established between the customer and the service provider.

Figure 5:
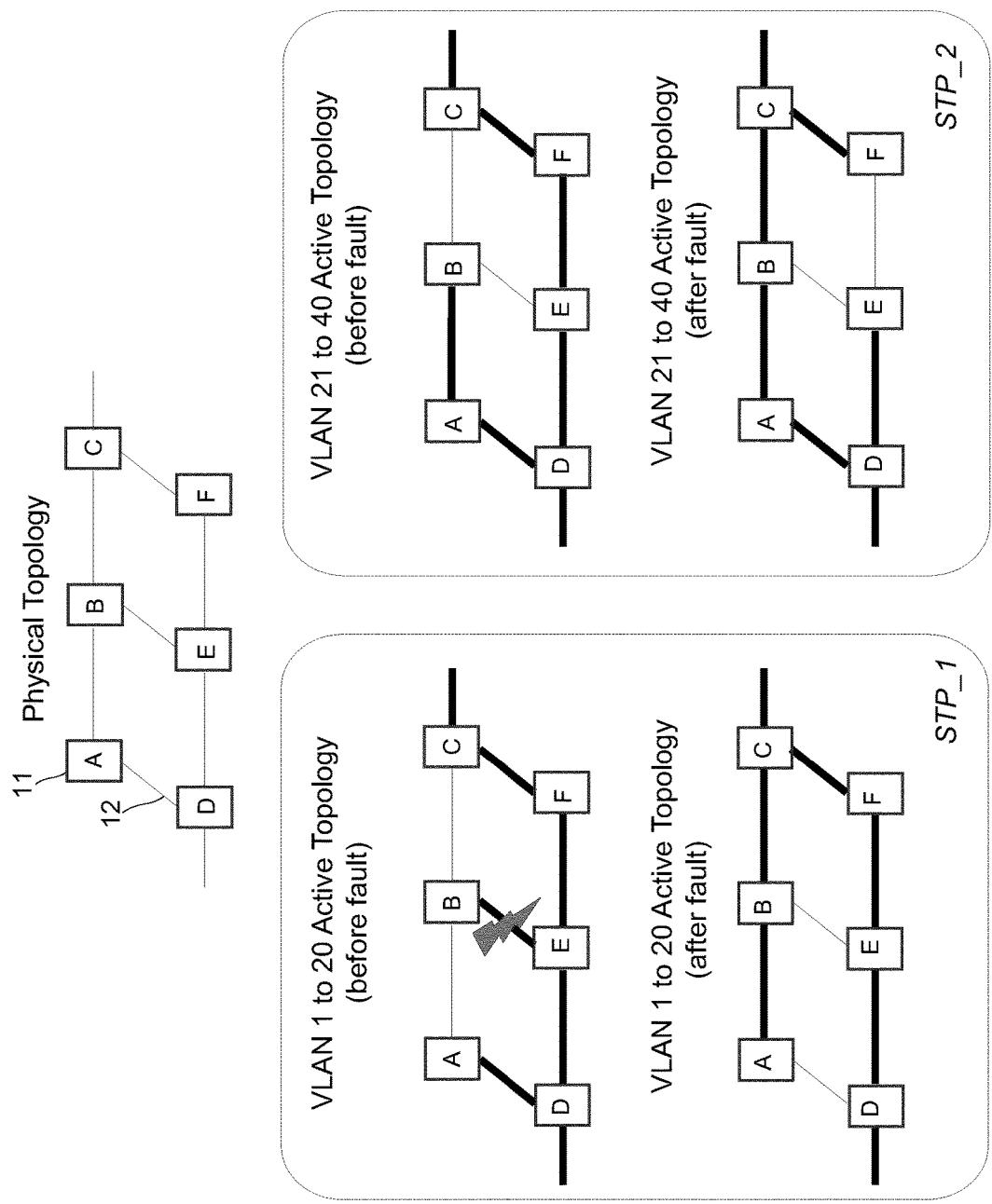
FIG. 5 shows a physical topology of a network and two active topologies (i.e. virtual LANs) which uses the physical topology.

To help illustrate problems of congestion, FIG. 5 shows an example topology for part of the network 10. The network has a physical topology. The physical topology represents the way in which nodes 11 are interconnected by links 12. In FIG. 5, there are six nodes A-F with links 12 connecting the nodes in a mesh topology. As described above, a connectionless Ethernet network will establish a loop-free path for traffic. The loop-free path is described by a spanning tree. This is called the "active topology", because it is the topology that is currently used to forward traffic. The active topology can be defined for a particular VLAN tag number, or range of VLAN tag numbers. Each active topology is called a spanning tree instance. FIG. 5 shows a first active topology STP_1 for VLAN IDs 1-20, and a second active topology STP_2 for VLAN IDs 21-40. The use of multiple spanning trees is called Multiple Spanning Tree Protocol (MSTP), and is described in IEEE 802.1Q-2005. To explain the active topology STP_1: traffic arriving at node D and destined for node A is forwarded to node A via the link D-A; traffic arriving at node D and destined for node B is forwarded to node E via the link D-E and then to node B via the link E-B; and so on.

FIG. 5 shows an active topology for each range of VLAN IDs and, for each active topology, shows the topology which exists before and after a fault on link E-B. For VLAN IDs 1-20, STP_1, node B is initially reached via the path D-E-B. Following the fault on link E-B, the active topology has to change as the link E-B is no longer available. In the revised active topology, node B is reached by the path D-E-F-C-B and node A is reached by the path D-E-F-C-B-A. For VLAN IDs 21-40, STP_2, the active topology also changes after the fault on link E-B. The active topology is determined by one or more link cost metrics advertised by nodes. Following the fault, it can be seen that the link between nodes A and B is used by both active topologies. If link A-B does not have enough capacity to fulfil all the bandwidth requirements of the traffic flows (services) with VLAN IDs (1 to 40), then congestion may occur on link A-B, and the services will become degraded.

Figure 6:
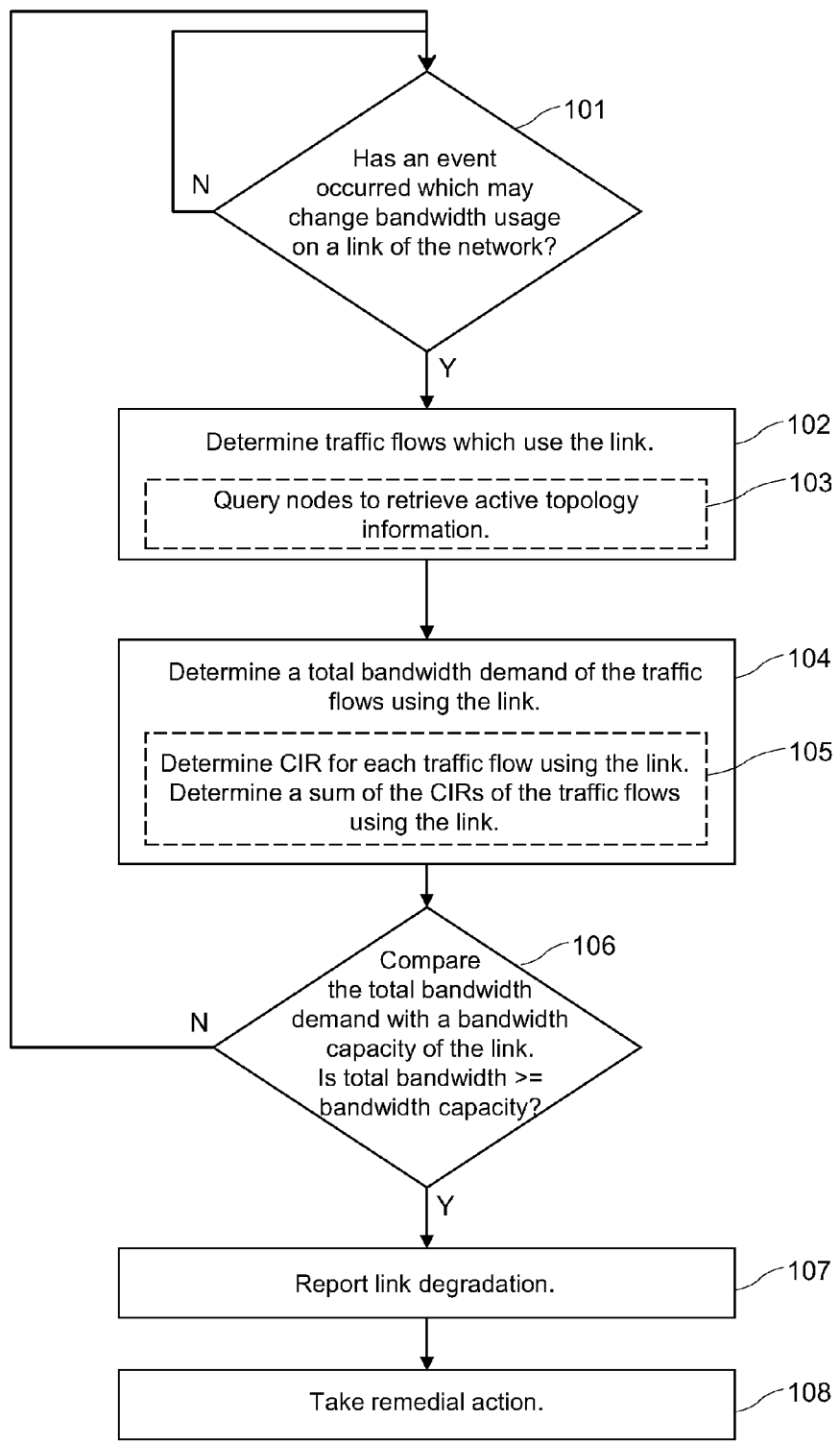
FIGS. 6 to 8 show a method of monitoring degradation of a link of the network.

FIG. 6 shows a method performed by the network management system 40. The method can respond to an event in the network which could change bandwidth usage on at least one of the links, such as a topology change event. An increase in bandwidth usage can cause congestion and degradation to the quality of service of one or more services carried by the congested links. The method can be performed in respect of multiple links.

At step 101 the method determines if an event has occurred in the network which may change bandwidth usage on a link of the network. If no event is detected at step 101, the method takes no further action and returns to step 101 to await an event. The link under consideration at step 101 and the following steps of the method can be any link of the network. In the example of FIG. 5, an event in the network (the failure of link E-B) may change bandwidth on multiple links of the network. Therefore, it is advantageous to perform the method for multiple links. The event can be one or more of: receiving an alarm indicating a network fault; receiving a topology change indication from a node of the network; and receiving a new root indication from a node of the network. If one of these events has occurred, the method proceeds to step 102 and determines traffic flows which use the link (on which bandwidth usage may have changed). This step may comprise a step 103 of querying nodes to retrieve active topology information. Advantageously, step 103 only queries those nodes which have reported a topology change at step 101. It has been described how the NMS stores information 47 about the physical topology of the network. The information 47 about the physical topology can define links between ports on the relevant nodes. The NMS 40 queries each relevant node, obtaining the Spanning Tree Protocol (STP) status of the ports for the related STP instance. Ports in the forwarding state (i.e. ports which are configured to forward frames/packets) are selected and, reading the attached links from the NMS database, the active topology is built. This is done for each of the STP instances in the case of MSTP.

At step 104 the method determines a total bandwidth demand of the traffic flows using the link. This step can comprise steps 105 of determining CIR for each traffic flow using the link and determining a sum of the CIRs of the traffic flows using the link. Advantageously the method is performed for every port/link of the new active topology. Referring again to the example of FIG. 5, following failure of link E-B, there is a new active topology for STP_1 and STP_2. The method is performed for every port/link of the new active topologies STP_1, STP_2 to detect any increase in bandwidth usage of the links.

At step 106 the method compares the total bandwidth demand with a bandwidth capacity of the link. Advantageously, an EVC is considered as not degraded if the configured Committed Information Rate (CIR) is available and guaranteed in respect to the active topology it is provisioned on. The CIR is the guaranteed bandwidth specified in the SLA for the given Ethernet service. EIR (Exceeded Information Rate) and potential overbooking factor are not considered in the traffic degradation/disruption detection. If step 106 determines that the total bandwidth is greater than, or equal to, the bandwidth capacity of the link, then the method proceeds to step 107. A link congestion/service degradation alarm shall be raised. This alarm can be a link alarm or an EVC alarm. The NMS can then, at step 108, take remedial action to relieve the congestion.

Figure 7:
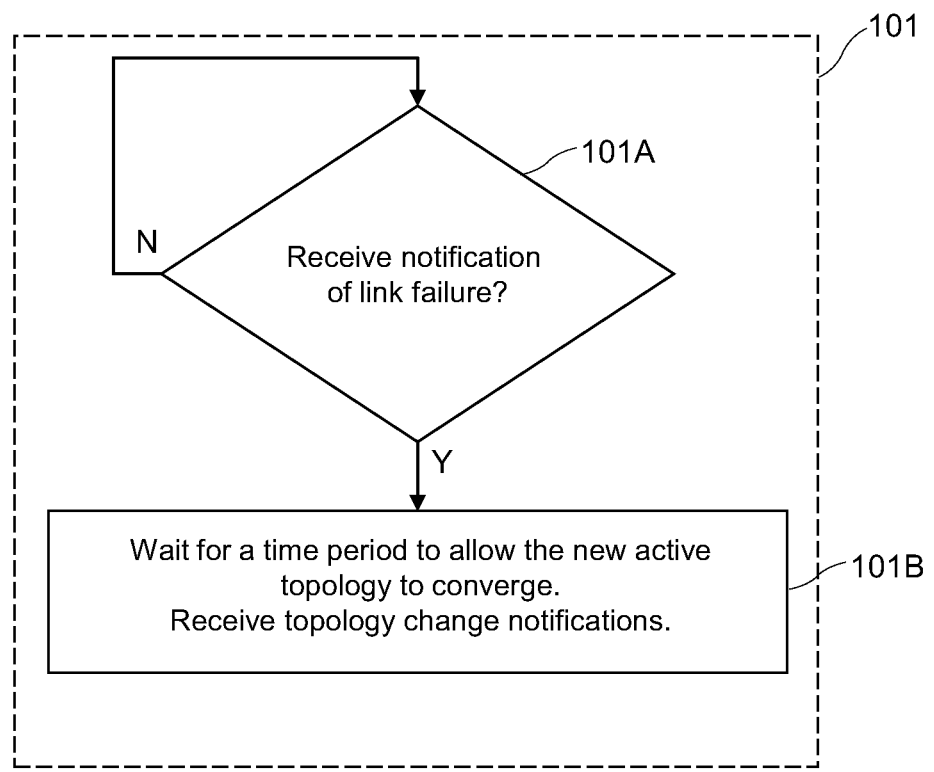

When a fault occurs in the network 10, multiple nodes may update their topology and therefore step 101 will receive messages from multiple nodes, each indicating that a topology change has occurred. Advantageously, the NMS is be able to correlate the topology change events to the relevant Spanning Tree instance to avoid performing the algorithm more than one time for the same Spanning Tree instance topology change. FIG. 7 shows an alternative form of step 101. As before, step 101 determines if an event has occurred in the network which may change bandwidth usage on a link of the network. Step 101A awaits receipt of a notification, from a node, of a link failure. A link failure can be notified by sending an alarm to the NMS. The alarm can identify a particular port of a node. If a link failure alarm is received at step 101A, this indicates that a link has failed and that nodes may attempt to converge to a new active topology which avoids the failed link. The method proceeds to step 101B and waits for a time period. The time period can be configurable. Advantageously, the time period is sufficiently long to allow a set of nodes to converge to a new active topology using the STP. Step 101B serves as a time filter. During this time period, step 101B collects topology change notifications from nodes. When the time period of step 101B has expired, the method proceeds to step 102 of FIG. 6, and proceeds in the same manner as previously described. Advantageously, steps 102, 103 query only those nodes which reported a topology change at step 101B.

Figure 8:
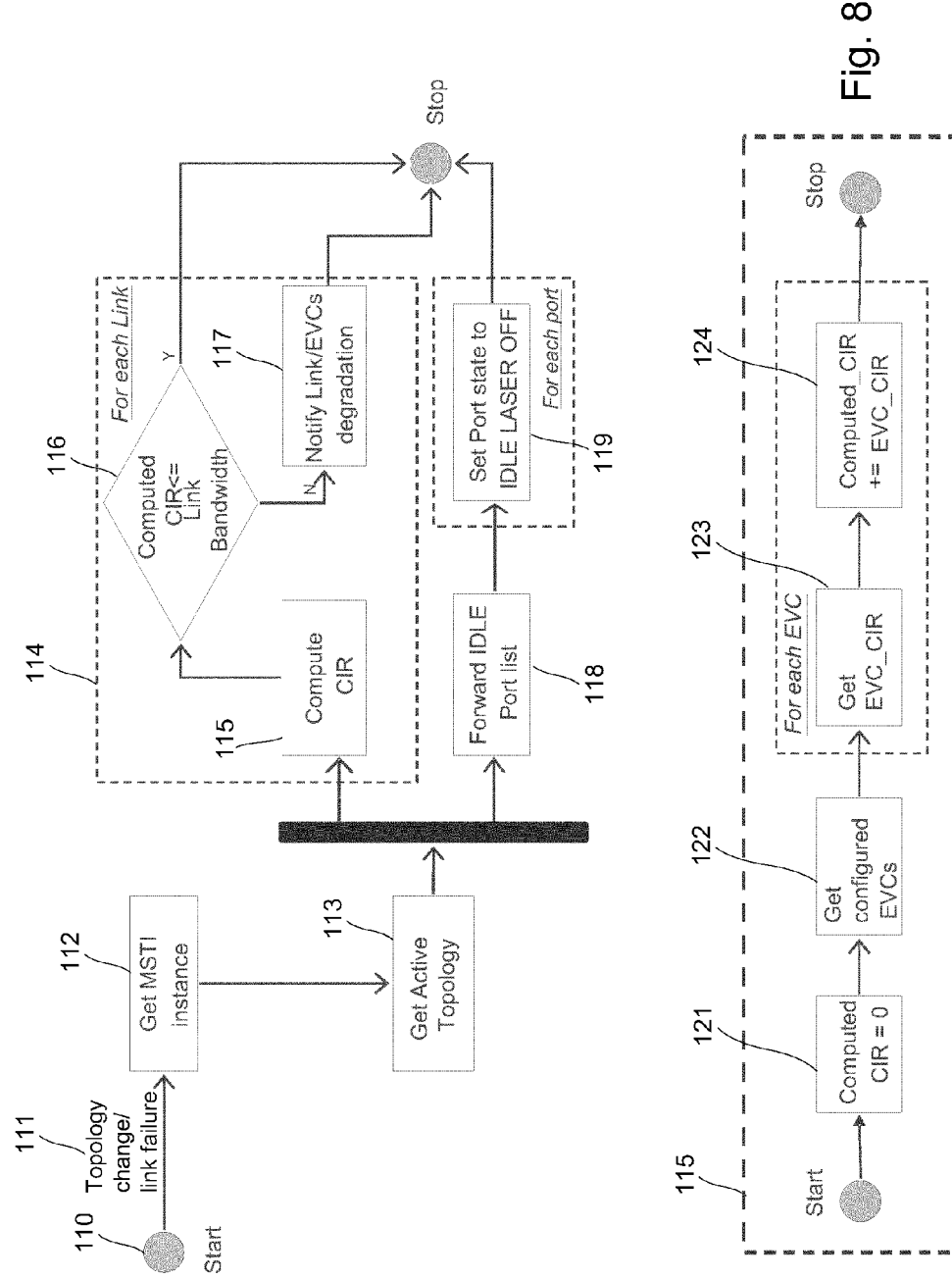

FIG. 8 shows the method in more detail. In addition to determining if congestion has occurred, the method can minimise the overall network power consumption by identifying any ports that are not carrying traffic. The source (typically a laser in the case of optical Ethernet) can be turned off, and therefore does not consume power but at a power level that is enough to be restarted quickly to react to an activation request.

The service degradation indication shall be in charge of the OSS system that shall be able to provide the following services:

Physical Topology management
Spanning tree active topology monitoring
EVC configuration (VLAN registration on ports)

In case of MSTP, the OSS System shall be able to store an association between the Multiple Spanning Tree Instance (MSTI) and the configured EVCs (VLANs) over it. We can consider a single MSTI instance in case of RSTP based networks to unify the model. Every MSTI represent a traffic layer where the sum of all the EVC CIR shall be always available on every links of the related active topology. Every time there is a topology change in an MSTI due to a Fault on the physical network, its active topology shall be rebuilt and for every link in the MSTI the sum of the CIR of the configured EVCs shall be available. Every MSTI change shall be processed in parallel to provide fast degradation detection.

Referring again to FIG. 1, controller 50 comprises functional modules 51-54 for performing the method of FIGS. 6 to 8. Controller 50 comprises: a module 51 which is arranged to determine when an event has occurred in the network which may change bandwidth usage on a link of the network; a module 52 which is arranged to determine traffic flows which use the link; a module 53 which is arranged to determine a total bandwidth demand of the traffic flows using the link; and a module 54 which is arranged to compare the total bandwidth demand with a bandwidth capacity of the link.

Figure 9:
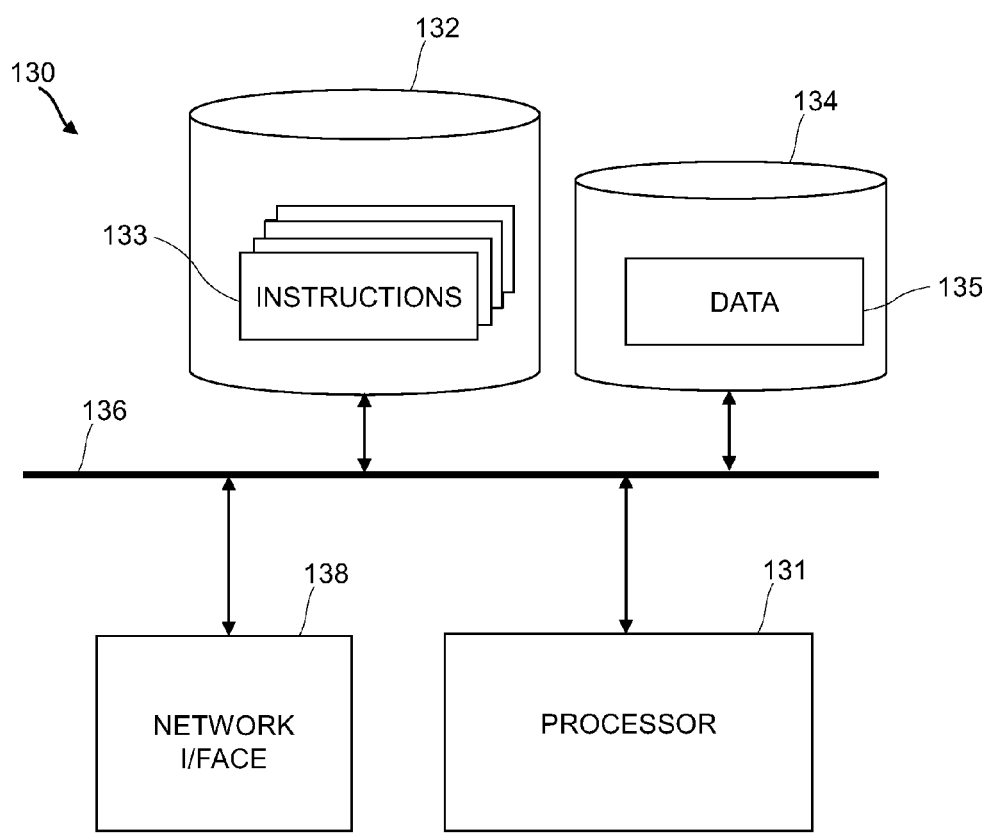
FIG. 9 shows apparatus for a computer-based implementation of the method.

FIG. 9 shows an exemplary processing apparatus 130 which may be implemented as any form of a computing and/or electronic device, and in which embodiments of the system and methods described above may be implemented. Processing apparatus 130 can be provided at the NMS 40. Processing apparatus may implement the method shown in any of FIGS. 6 to 8. Processing apparatus 130 comprises one or more processors 131 which may be microprocessors, controllers or any other suitable type of processors for executing instructions to control the operation of the device. The processor 131 is connected to other components of the device via one or more buses 136. Processor-executable instructions 133 may be provided using any computer-readable media, such as memory 132. The processor-executable instructions 133 can comprise instructions for implementing the functional modules 51-54. The memory 132 is of any suitable type such as read-only memory (ROM), random access memory (RAM), a storage device of any type such as a magnetic or optical storage device. Additional memory 134 can be provided to store data 135 used by the processor 131. The processing apparatus 130 comprises one or more network interfaces 138 for interfacing with other network entities, such as nodes 11 of the network 10.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of monitoring a Carrier Ethernet network comprising nodes connected by links, the network supporting connectionless traffic flows between edge nodes of the network, the method comprising, at a network management system:
   the network management system determining when an event that has a potential to change bandwidth usage on a link of the network has occurred in the network;
   the network management system, in response to a determination that the event that has the potential to change bandwidth usage on the link of the network has occurred in the network, performing:
      determining traffic flows which use the link;
      determining a total bandwidth demand of the traffic flows using the link;
      comparing the total bandwidth demand with a bandwidth capacity of the link; and
      reporting a link degradation if an outcome of the step of comparing the total bandwidth demand with a bandwidth capacity of the link indicates that the total bandwidth demand exceeds the bandwidth capacity of the link,
   wherein the step of determining when an event has occurred in the network that has the potential to change bandwidth usage on a link of the network comprises:
      receiving an alarm indicating a network fault; and
      waiting for a time period for nodes of the network to converge on an active topology.

2. A method according to claim 1 wherein the step of determining traffic flows which use the link comprises querying a node of the network to retrieve active topology information.

3. A method according to claim 1 wherein the step of determining traffic flows which use the link comprises using a store of information which indicates a spanning tree instance and a traffic flow using that spanning tree.

4. A method according to claim 1 wherein the step of determining a total bandwidth demand of the traffic flows using the link comprises using a store of information which indicates traffic flows and parameters of each of the traffic flows.

5. A method according to claim 1 wherein the step of determining a total bandwidth demand of the traffic flows using the link comprises:
   determining a Committed Information Rate for each of the traffic flows using the link; and
   determining a sum of the Committed Information Rates of the traffic flows using the link.

6. A method according to claim 1 wherein the step of determining when an event that has a potential to change bandwidth usage on a link of the network has occurred in the network comprises at least one of:
   receiving a topology change indication from a node of the network; and
   receiving a new root indication from a node of the network.

7. A method according to claim 1, comprising repeating for a plurality of different links of the network the steps of:
   determining traffic flows which use the link,
   determining the total bandwidth demand of the traffic flows using the link, and
   comparing the total bandwidth demand with the bandwidth capacity of the link.

8. An apparatus for use at a network management system of a network comprising nodes connected by links, the network supporting connectionless traffic flows between edge nodes of the network, the apparatus comprising:
   an event monitor which is arranged to determine when an event that has a potential to change bandwidth usage on a link of the network has occurred in the network;
   a traffic monitor which is arranged to determine traffic flows which use the link;
   a bandwidth monitor which is arranged to determine a total bandwidth demand of the traffic flows using the link; and
   a comparator which is arranged to compare the total bandwidth demand with a bandwidth capacity of the link,
   wherein the comparator is further arranged to report a link degradation if the total bandwidth demand exceeds the bandwidth capacity of the link,
   wherein the traffic monitor, the bandwidth monitor, and the comparator are arranged to operate in response to a determination that the event that has the potential to change bandwidth usage on the link of the network has occurred in the network, and
   wherein the event monitor is arranged to perform the determining by performing:
      receiving an alarm indicating a network fault; and waiting for a time period for nodes of the network to converge on an active topology.

9. The apparatus according to claim 8 wherein the traffic monitor is arranged to query nodes of the network to retrieve active topology information.

10. The apparatus according to claim 8 further comprising a store which is arranged to store information which indicates traffic flows and parameters of each of the traffic flows and the bandwidth monitor is arranged to use the store.

11. The apparatus of claim 8, wherein the apparatus is an element in a Carrier Ethernet communication network comprising a plurality of nodes connected by links, the network supporting connectionless traffic flows between nodes.

12. A non-transitory machine-readable medium carrying instructions which, when executed by a processor, cause the processor to perform a method of monitoring a Carrier Ethernet network comprising nodes connected by links, the network supporting connectionless traffic flows between edge nodes of the network, the method comprising, at a network management system:

determining when an event that has a potential to change bandwidth usage on a link of the network has occurred in the network;

in response to a determination that the event that has the potential to change bandwidth usage on the link of the network has occurred in the network, performing:

determining traffic flows which use the link;

determining a total bandwidth demand of the traffic flows using the link;

comparing the total bandwidth demand with a bandwidth capacity of the link; and reporting a link degradation if an outcome of the step of comparing the total bandwidth demand with a bandwidth capacity of the link indicates that the total bandwidth demand exceeds the bandwidth capacity of the link, wherein the step of determining when an event has occurred in the network that has the potential to change bandwidth usage on a link of the network comprises:

receiving an alarm indicating a network fault; and waiting for a time period for nodes of the network to converge on an active topology.

* * * * *